United States Patent [19]

Yoon

[11] Patent Number: 4,935,762
[45] Date of Patent: Jun. 19, 1990

[54] AUTO/MANUAL SWITCHING CIRCUIT

[75] Inventor: Jeong S. Yoon, Kyungki, Rep. of Korea

[73] Assignee: Goldstar Co., Ltd., Seoul, Rep. of Korea

[21] Appl. No.: 386,128

[22] Filed: Jul. 28, 1989

[30] Foreign Application Priority Data

Jul. 30, 1988 [KR] Rep. of Korea ............... 9721/1988

[51] Int. Cl.⁵ .................................. G03B 3/00
[52] U.S. Cl. ................... 354/400; 354/195.1; 358/227
[58] Field of Search ............ 354/400, 195.1, 409; 358/227; 352/140

[56] References Cited

U.S. PATENT DOCUMENTS

| | | |
|---|---|---|
| 4,572,643 | 2/1986 | akashi .............................. 354/409 |
| 4,740,076 | 4/1988 | Ueda et al. ....................... 354/400 |
| 4,845,521 | 7/1989 | Akashi .............................. 354/400 |

Primary Examiner—W. B. Perkey

[57] ABSTRACT

An auto/manual changing switch cirucit for an auto-focus circuit which allows the changing of states by a one touch system. To change a video camera from an auto-focus state to a manual focus state, a switch is activated. While in this manual state, the auto-focus state can be temporarily engaged by the one touch system wherein the manual focus state is automatically returned to maintaining the temporary auto-focus state. The switching circuit to realize these functions includes a pulse generating circuit for an auto/manual changing switch, an auto-focus changing pulse generating circuit, an auto-focus releasing pulse generating circuit, and an auto/manual focus changing circuit. The changing of state operation is very simple and the focusing of video image during the recording process at a time of changing the focus state does not cause any substantial joggling.

1 Claim, 3 Drawing Sheets

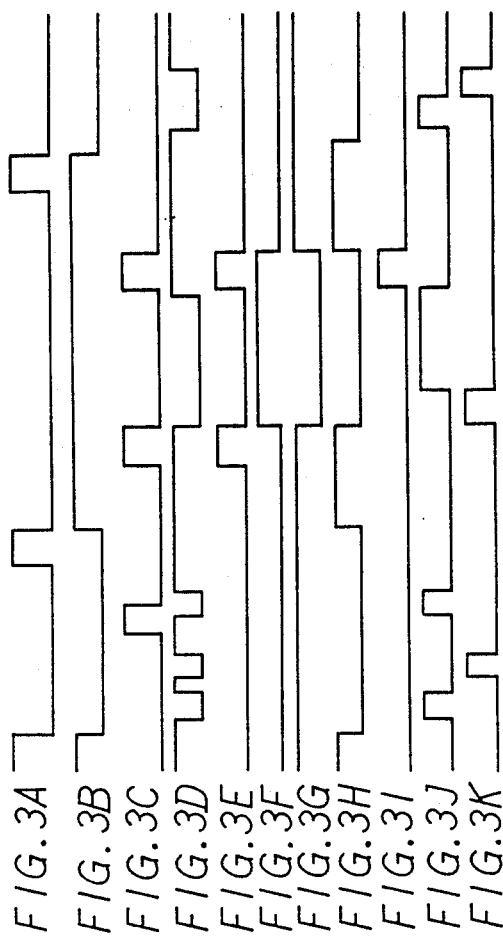

AUTO/MANUAL SWITCHING CIRCUIT

BACKGROUND OF THE INVENTION

The present invention relates to an auto/manual switching circuit for an auto-focus circuit in a video camera, and in particular, to an auto manual switching circuit for an auto/focus circuit which is changed by a one touch system, for example, when changing to a manual-focus state from an auto-focus state.

Conventional auto-focus auto/manual switching circuit, as shown in FIG. 1, is constructed such that auto/-manual is selected by a slide switch SW11. This slide switch is changed from a state of selecting the manual operation to a temporary auto-state by a push button switch SW12. That to realize this objective, the slide switch SW11 is shorted to an auto-terminal A causing a power supply voltage to be applied to the auto-focus circuit by controlling the ground potential of regulator 12 by a control unit 11. When the slide switch SW11 is shorted to a manual terminal M, a power supply voltage is applied to the auto-focus circuit by controlling the ground potential of regulator 12 by the control unit 11. When pressing the push button switch SW12.

However, in this conventional circuit, when the video camera is changed from the auto-focus state to the manual focus state, it is changed by using the slide switch causing the video camera to become joggled at the time of sliding the slide switch. This joggling causes focusing of the image in recording to be shaken and the recording of a clear image hard to achieve. On the other hand, when the auto-focus state by push button is desired to be used during the manual focus state, the disadvantage is that the push button switch has to be pressed until the auto-focus is completed.

SUMMARY OF THE INVENTION

Therefore, it is an object of the present invention to provide an auto/manual switching circuit capable of executing the change of the auto/manual focus at the recording state by one touch system.

Another object of the present invention is to provide an auto/manual switching circuit which is changed automatically to the manual focus state after maintaining a temporary auto-focus state by one touch system during the manual focus state.

These objects of the present invention are attained when an auto-selection switch is touched during the manual focus state and returning to the manual focus state when the switch is touching again. When a the auto-selection switch, and when a temporary auto-selection switch is touched during the manual focus state and after the auto-focus state is temporarily maintained, the operational state is returned automatically to the manual focus state.

The foregoing and other objects as well as advantages of the present invention will become clear by the following description of the invention with reference to the accompanying drawings.

BRIEF DESCRIPTION OF THE DRAWINGS

FIGS. 3A to 3K are wave form charts for showing respective portions of FIG. 2.

DETAILED DESCRIPTION OF THE PREFERRED EMBODIMENT

Figure 1:
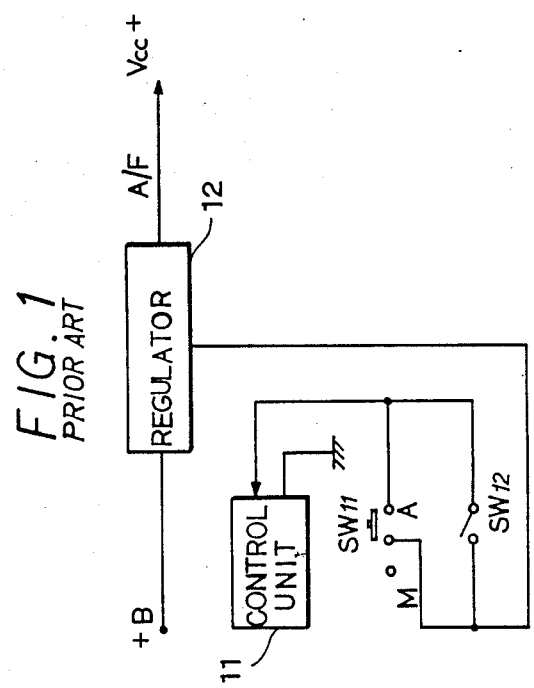
FIG. 1 is a block diagram of conventional auto/-manual changing switch circuit.
Figure 2:
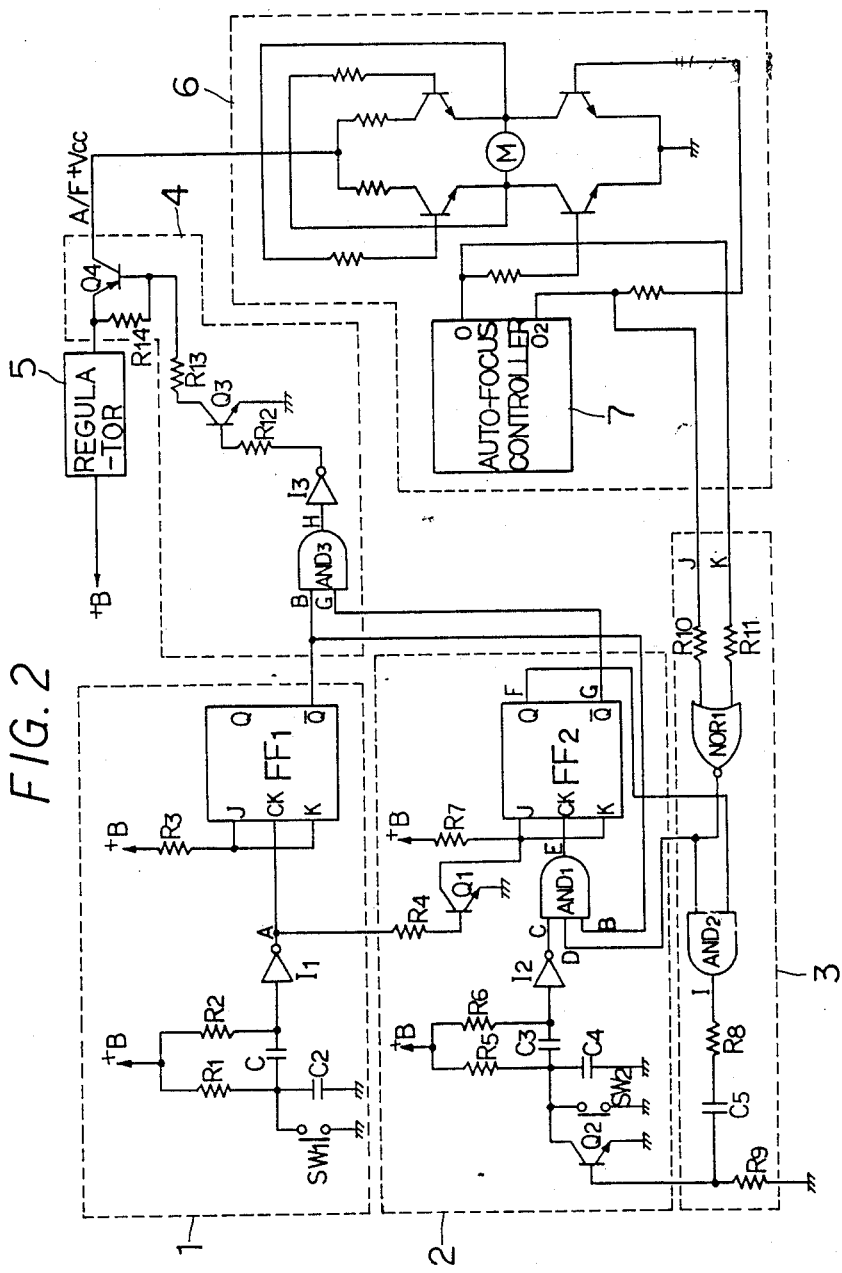
FIG. 2 is a circuit diagram of auto/manual changing switch circuit of a preferred embodiment of the present invention.

FIG. 2 is a circuit diagram of auto/manual switching circuit of the present invention, as shown in the drawing, which is comprised of: a pulse generating circuit 1 for auto/manual switching in which an auto-selection switch SW1 is connected to a capacitor C2 and, a clock terminal CK of flip-flop FF1 through a capacitor C1 and an inverter I1 so that the output signal of the flip-flop FF1, is inverted for every activation of the auto-selection switch SW1; an auto-focus changing pulse generating circuit 2 in which a temporary auto-selection switch SW2 is connected to a collector of a transistor Q2, to a capacitor C4 at the same time, to the one side input terminal of AND gate AND 1 through a capacitor C3 and inverter I2; the output terminal $\overline{Q}$ of the flip-flop FF1 and the output terminal of a NOR gate NOR 1 are connected to the other input terminal of the AND gate AND 1. The output terminal of the AND gate AND 1 is connected to the clock terminal CK of flip-flop FF2 as that the output signal of the flip-flop FF2 is inverted when the temporary auto-selection switch SW2 is touched during the manual focus state. An auto-focus releasing pulse generating circuit 3 is also included in which the output terminals Q1 and Q2 of an auto-focus control means 7 are connected to the input terminals of NOR gate NOR 1 through resistors R10 and R11. The output terminal of this NOR gate NOR 1 and the output terminal Q of the flip-flop FF2 are connected to the input terminal of AND gate AND 2. The output of this AND gate AND 2 is connected to the node of a resistor R9 and the base of the transistor Q2 through a resistor R8 and a capacitor C5 so that the output signal of the auto-focus changing pulse generating circuit 2 is inverted at the time of completing the auto-focusing of auto-focus control means 7. The present invention further comprises an auto/manual focus changing circuit 4 in which the output terminals $\overline{Q}$ and $\overline{Q}$ of the flip-flops FF1 and FF2 are connected to the input terminals of AND gate AND 3. Its output terminal is connected to the base of transistor Q3 through an inverter I3 and a resistor R12. The collector of this transistor Q3 is connected to the base of transistor Q4 through a resistor R13. The emitter and collector of this transistor Q4 are connected respectively to the output terminal of regulator 5 and to the power input terminal of auto-focus circuit 6 so that the power voltage is applied to the auto-focus circuit 6 when the low potential signal is outputted from any one of the output terminals $\overline{Q}$ and $\overline{Q}$ of the flip-flops FF1 and FF2.

FIGS. 3A to 3K illustrate the output waveforms of respective portions of FIG. 2. The operation and effect of the present invention will be described in detail with reference to FIGS. 2 and 3A to 3K.

When the auto-selection switch SW1 is touched, a capacitor C1 is charged with a voltage and a high potential signal is outputted for a predetermined period of time at inverter I1 as shown in FIG. 3A to be applied to the clock terminal CK of flip-flop FF1. As a result, the signal inverted from the high potential as shown in FIG. 3B and is outputted from the output terminal $\overline{Q}$ of the flip-flop FF1. Since the low potential signal is applied to the input terminal of AND gate AND 3, regardless of the state of the output terminal $\overline{Q}$ of flip-flop FF2, the low potential signal is outputted from the AND gate AND 3 as shown in FIG. 3H. This low potential signal is inverted to a high potential signal at inverter I3, causing the transistor Q3 to become conductive.

Therefore at this moment, the base potential of the transistor becomes lower than the potential of the emitter and becomes conductive, as a result, the ouutput voltage of the regulator 5 is applied as a power supply voltage to the auto-focus circuit 6 through the transistor Q4. Therefore an, auto-focus state is realized by the control of auto-focus control means 7.

Since the high potential signal outputted from the inverter I1 at the time of activating the auto-selection switch SW1 causes the transistor Q1 to be conductive, the low potential is applied to the input terminals J and K of flip-flop FF2. Accordingly the state of the low potential signal being outputted from the output terminal Q and the high potential signal being output at the output terminal $\overline{Q}$ of the flip-flop FF2 is maintained.

When the auto-selection switch SW1 is activated again, during the auto-focus state as above, the high potential signal is outputted for a predetermined period of time from the inverter I1 as shown in FIG. 3A and applied to the clock terminal CK of flip-flop FF1. As a result, the signal is inverted from the low potential to the high potential at the output terminal Q of the flip-flop FF1 as shown in FIG. 3B and applied to one input terminal of AND gate AND 3. At this moment, since the high potential signal outputted from the output terminal $\overline{Q}$ of flip-flop FF2 is applied to other input terminal of the AND gate AND 3, the high potential signal is outputted from the AND gate AND 3 as shown in FIG. 3H. This high potential signal is inverted to a low potential signal at the inverter I3, causing the transistor Q3 to turn OFF. Accordingly, the transistor Q4 is turned OFF and thereby the output voltage of the regulator 5 being applying to the auto-focus circuit 6 is cut off so the manual focus state is realized.

When the temporary auto-selection switch SW2 is activated during the manual focus state as this a voltage is a capacitor C3, is charged with a voltage and the high potential signal is outputted from the inverter I2 for a predetermined period of time as shown in FIG. 3C to be applied to one side input terminal of AND gate AND 1. The low potential signal is outputted from the output terminals Q1 and Q2 of the auto-focus control means 7 during a manual focus state as shown in FIGS. 3J and 3K. The high potential signal is outputted from NOR gate NOR1 as shown in FIG. 3D. Since this high potential signal is applied to the intermediate terminal of AND gate AND 1, the high potential signal is outputted from the AND gate AND 1 as shown in FIG. 3E and applied to the clock terminal CK of flip-flop FF2. Therefore, at this moment, the output signal of the flip-flop FF2 is inverted and the high potential signal is outputted from its output terminal Q as shown in FIG. 3F. A low potential signal is outputted from the output terminal $\overline{Q}$ as shown in FIG. 3G. Thus, since the low potential signal outputted from the output terminal $\overline{Q}$ of flip-flop FF2 is inputted to the input terminal of AND gate AND 3, a low potential signal is outputted from its output terminal as shown in FIG. 3H. Since this low potential signal is inverted to the high potential signal by the inverter I3 and render the transistor Q3 ON, the transistor Q4 also becomes conductive and the output voltage of the regulator 5 is applied as a power supply voltage to the auto-focus circuit 6. Thereby realizing the auto-focus state. At this moment, the mutually inversed signals are respectively outputted from the output terminals Q1 and Q2 of the auto-focus control means 7 as shown in FIGS. 3J and 3K, and the low potential signal is outputted from NOR gate NOR 1 as shown in FIG. 3D.

When the auto-focusing is completed by operating as described above, the low potential signal is outputted at the output terminals Q1 and Q2 of the auto-focus control means 7 as shown in FIGS. 3J and 3K. The high potential signal is outputted from NOR gate NOR 1 as shown in FIG. 3D and applied to one input terminal of AND gate AND 2. Since the high potential signal outputted from the output terminal $\overline{Q}$ of flip-flop FF1 is applied to other input terminal of AND gate AND 2, the high potential signal is outputted from the AND gate AND 2 as shown in FIG. 3I. This high potential signal causes the transistor Q2 to be conductive through a resistor R8 and a capacitor C5.

Therefore, high potential signal is outputted from the output terminal of the inverter I2 as shown in FIG. 3C and applied to the input terminal of AND gate AND 1. Since the high potential signal outputted from the output terminal $\overline{Q}$ of the flip-flop FF1 and the high potential signal outputted from the NOR gate NOR1 are applied to other input terminal of the AND gate AND 1, the high potential signal is outputted from the AND gate AND 1 as shown in FIG. 3E and applied to the clock terminal CK of flip-flop FF2. Therefore, the output signals of the flip-flop FF2 are inverted, and the low potential signal and the high potential signal are respectively outputted from the ouptut terminals Q and $\overline{Q}$ as shown in FIGS. 3F and 3G.

Thus, since the high potential signal is applied to the input terminal of AND gate AND 3, and the high potential signal outputted from the output terminal $\overline{Q}$ of the flip-flop FF1 is applied to other input terminal of the AND gate AND 3, the high potential signal is outputted from the AND gate AND 3 as shown in FIG. 3H. Since this high potential signal is inverted to a low potential signal at the inverter I3, turning the transistor Q3 OFF, the transistor Q4 also turns OFF. Therefore, the output voltage of the regulator 5 which is applied to the auto-focus circuit 6 becomes cut off, and the auto-focus circuit 6 becomes the manual focus state.

As described above in detail, the present invention is changed an either a auto-focus state or to manual focus state by one a single touch of a switch. The changing to the temporary auto-focus state during the manual focus state is executed by a single touching of the switch and being changed automatically to the manual focus state when the time of temporary auto-focus is completed. Therefore, there the changing operations become very simple, at the same time, the focusing of the image in recording is not changed at the time of changing the focus.

It will be appreciated that the present invention is not restricted to the particular embodiment that has been described hereinbefore, and that variations and modifications may be made therein without departing from the spirit and scope of the invention as defined in the appended claims and equivalents thereof.

What is claimed is:

1. An auto/manual switching circuit for an auto/focus circuit comprising:
   a mode selection switch;
   a touch switch;
   pulse generating means for inverting a state of a first output signal in response to an activation of said mode selection switch;

auto-focus changing pulse generating means for inverting a state of a second output in response to an activation of said touch switch or in response to a transistor being ON during a manual focus state caused by a manual focus selection signal being outputted from the pulse generating circuit;

auto-focus releasing pulse generating means for turning a transistor ON in said auto-focus changing pulse generating means when said second output signal is an auto-focus selection signal and is outputted from said auto-focus changing pulse generating means; and auto/manual focus changing means for applying an output voltage to the auto-focus circuit as a power supply voltage either when said first output signal from said pulse generating means is in a high state or when said auto-focus selection signal is outputted from said auto-focus changing pulse generating means.

* * * * *